(12) United States Patent
Holder et al.

(10) Patent No.: US 7,035,674 B1
(45) Date of Patent: Apr. 25, 2006

(54) METHODS AND SYSTEMS FOR ENABLING ADDRESS BOOK SELECTION AND COMMUNICATION WITH A WIRELESS DEVICE

(75) Inventors: Maleika C. Holder, Jonesboro, GA (US); Darryl C. Moore, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 589 days.

(21) Appl. No.: 10/211,210

(22) Filed: Aug. 2, 2002

(51) Int. Cl.
*H04B 1/38* (2006.01)
*H04B 7/00* (2006.01)
*H04Q 7/20* (2006.01)
*H04M 3/42* (2006.01)

(52) U.S. Cl. .................. 455/566; 455/417; 455/432.3; 455/461; 455/517; 455/550.1; 455/415

(58) Field of Classification Search ........ 455/417–418, 455/422.1, 432.3, 433–434, 450, 457–462, 455/516–517, 550.1, 566, 456.3–456.6, 414.4, 455/415, 420, 426.1, 426.2, 412.1, 414.1, 455/514–515, 557, 554.2, 556.1, 556.2, 560–561; 379/221.08, 221.09, 221.1, 221.12, 112.01, 379/142.17, 178, 185; 709/216–229, 203, 709/206; 370/313, 349
See application file for complete search history.

(56) References Cited

U.S. PATENT DOCUMENTS

| | | | |
|---|---|---|---|
| 4,166,929 A | | 9/1979 | Sheinbein |
| 4,582,956 A | | 4/1986 | Doughty |
| 4,959,855 A | | 9/1990 | Daudelin |
| 5,155,761 A | | 10/1992 | Hammond |
| 5,438,568 A | | 8/1995 | Weisser, Jr. |
| 5,511,111 A | | 4/1996 | Serbetcioglu et al. |
| 5,572,583 A | | 11/1996 | Wheeler, Jr. et al. |
| 5,758,281 A | * | 5/1998 | Emery et al. ............... 455/428 |
| 5,841,854 A | * | 11/1998 | Schumacher et al. .. 379/265.11 |
| 5,898,917 A | | 4/1999 | Batni et al. |
| 5,943,409 A | | 8/1999 | Malik |
| 5,978,672 A | * | 11/1999 | Hartmaier et al. .......... 455/413 |
| 5,991,364 A | | 11/1999 | McAllister et al. |
| 6,014,377 A | * | 1/2000 | Gillespie .................... 370/351 |
| 6,018,737 A | * | 1/2000 | Shah et al. ................... 707/10 |
| 6,035,031 A | | 3/2000 | Silverman |

(Continued)

OTHER PUBLICATIONS

U.S. Appl. No. 10/207,586, filed Jul. 29, 2002.

(Continued)

*Primary Examiner*—William Trost
*Assistant Examiner*—Meless Zewdu
(74) *Attorney, Agent, or Firm*—Cantor Colburn L.L.P.

(57) ABSTRACT

Methods and systems are provided for establishing communication with a wireless device and a recipient telecommunications device in a telecommunications network. In one computer-assisted embodiment, the method includes identifying at least a first address associated with the recipient telecommunications device; and, processing the first address for retrieving at least a second address associated with the recipient telecommunications device. The second address is employable to establish communication between the wireless device and the recipient telecommunications device. In another aspect, a system embodiment includes an AIN network configured to establish communications between the wireless device and a database and/or the recipient telecommunications device. In various method and system embodiments, at least one of the addresses includes a telephone number, a pager number, an electronic mail address, an instant messaging address, and/or a facsimile number.

12 Claims, 8 Drawing Sheets

U.S. PATENT DOCUMENTS

| | | | |
|---|---|---|---|
| 6,075,783 A * | 6/2000 | Voit | 370/352 |
| 6,104,786 A | 8/2000 | Gibilisco et al. | |
| 6,178,240 B1 | 1/2001 | Walker et al. | |
| 6,212,268 B1 | 4/2001 | Nielsen | |
| 6,317,594 B1 * | 11/2001 | Gossman et al. | 455/414.1 |
| 6,408,062 B1 | 6/2002 | Cave | |
| 6,477,374 B1 | 11/2002 | Shaffer et al. | |
| 6,542,733 B1 * | 4/2003 | Dennis | 455/414.1 |
| 6,658,106 B1 | 12/2003 | Atkinson et al. | |
| 6,716,101 B1 * | 4/2004 | Meadows et al. | 455/456.1 |
| 2002/0052195 A1 * | 5/2002 | Lee | 455/414 |
| 2002/0147818 A1 * | 10/2002 | Wengrovitz | 709/228 |
| 2003/0081752 A1 | 5/2003 | Trandal et al. | |

OTHER PUBLICATIONS

U.S. Appl. No. 10/255,888, filed Sep. 26, 2002.

U.S. Appl. No. 10/370,643, filed Feb. 2, 2003.

* cited by examiner

METHODS AND SYSTEMS FOR ENABLING ADDRESS BOOK SELECTION AND COMMUNICATION WITH A WIRELESS DEVICE

BACKGROUND

The present methods and systems are generally related to telecommunication methods and systems. The present methods and systems are more particularly related to enabling communication between and/or among users of wireless devices and other types of devices in a telecommunications network.

As the use of wireless devices becomes more prevalent in modern society, there is an increasing need for establishing a greater number and variety of paths of communication between and among users of wireless devices and other types of devices in a telecommunications network. In conventional practice, most wireless devices typically only store telephone numbers that can be accessed to communicate with the user or devices associated with those telephone numbers. Most wireless devices store only telephone numbers and associated text data (e.g., the telephone number and name of a recipient) in one or more address books, for example, associated with the wireless devices.

Thus, conventional wireless devices often do not account for addresses associated with the myriad methods and systems by which users of a telecommunications network may desire to communicate. Examples of other potential communication addresses include, for example, electronic mail address, instant messaging address, pager address, facsimile transmission number, and others. Conventional wireless devices, however, typically do not provide information other than a telephone number by which a wireless device can communicate with another user in the telecommunications network.

What are needed, therefore, are improved methods and systems for enabling selection of communication paths, as well as using the communication paths to establish communication, between/among users of wireless devices and other types of users and devices within a telecommunications network.

SUMMARY

Methods and systems are provided for establishing communication with a wireless device and a recipient telecommunications device in a telecommunications network. In one computer-assisted embodiment, the method includes identifying at least a first address associated with the recipient telecommunications device; and, processing the first address for retrieving at least a second address associated with the recipient telecommunications device. The second address is employable to establish communication between the wireless device and the recipient telecommunications device. In another aspect, the method includes displaying at least one of the first and second addresses on a screen of the wireless device. In another aspect, the method includes selecting at least one of the first and second addresses to establish communication with the wireless device and the recipient telecommunications device. In various method embodiments, at least one of the addresses includes a telephone number, a pager number, an electronic mail address, and/or an instant messaging address.

In another embodiment, a system is provided for establishing communication with a wireless device and a recipient telecommunications device in a telecommunications network. The system includes a database structured for operative communication with the wireless device, the database including at least first and second addresses associated with the recipient telecommunications device; and, an address book storage operatively associated with the wireless device, the address book storage being configured to receive at least one of the first and second addresses from the database. In one aspect, the system includes an AIN network configured to establish communications between the wireless device and the database. In another aspect, the system includes an AIN network configured to establish communications between the wireless device and the recipient telecommunications device.

Computer readable media embodiments are also provided in accordance with the present methods and systems.

DESCRIPTION

The terms "calling party" and "user" are used herein generally to refer to the person or device that initiates a telecommunication. The calling party may also be referred to herein as "caller." In some cases, the calling party may not be a person, but may be a device such as a facsimile machine, an answering service, a modem, and the like. The term "recipient" is used herein generally to refer to the person or device that receives the call or communication.

The term "communication" is used herein to include all messages or calls that may be exchanged between a calling party and a recipient, including voice, data, facsimile and video messages. The term "communication" is used synonymously herein with the term "call" unless otherwise noted.

The term "subscriber" as used herein refers generally to a subscriber of the telecommunications services provided in association with the present methods and systems.

The term "address" as applied herein may include, for example and without limitation, a telephone number, a cellular telephone number, a wireless telephone number, a pager number, an electronic mail address, an instant messaging address, and/or a facsimile transmission number.

The present methods and systems, in various embodiments, include using a wireless telecommunications device for retrieving user or subscriber information from an address book storage directly or indirectly operatively associated with the wireless device. Retrieving the user or subscriber information permits the wireless device to send one or more messages from the wireless device to a recipient. Transmitted messages may be, for example and without limitation, a wireless pager transmission, an electronic mail message, a facsimile transmission, or a wireless telephone call. In various aspects of the present methods and systems, the user (such as a subscriber of the telecommunications services described herein, for example) of the wireless device can create messages by entering text, numbers, or an alphanumeric message using a keypad or keyboard that is operatively associated with the wireless device.

According to various embodiments of the present methods and systems, a system is provided that utilizes the intelligent functionality of an Advanced Intelligent Network (AIN). The AIN resides in the existing Common Channel Signaling (CCS) network that exists in most public switched telephone networks (PSTNs), using Signaling System 7 (SS7) protocol to request routing instruction. Unlike traditional networks that depend heavily on switch-based translations and features to provide call-processing intelligence, the AIN is a service-independent architecture designed to be programmable and controllable by software distributed in elements throughout the AIN, rather than by switch-based translations.

Figure 1:
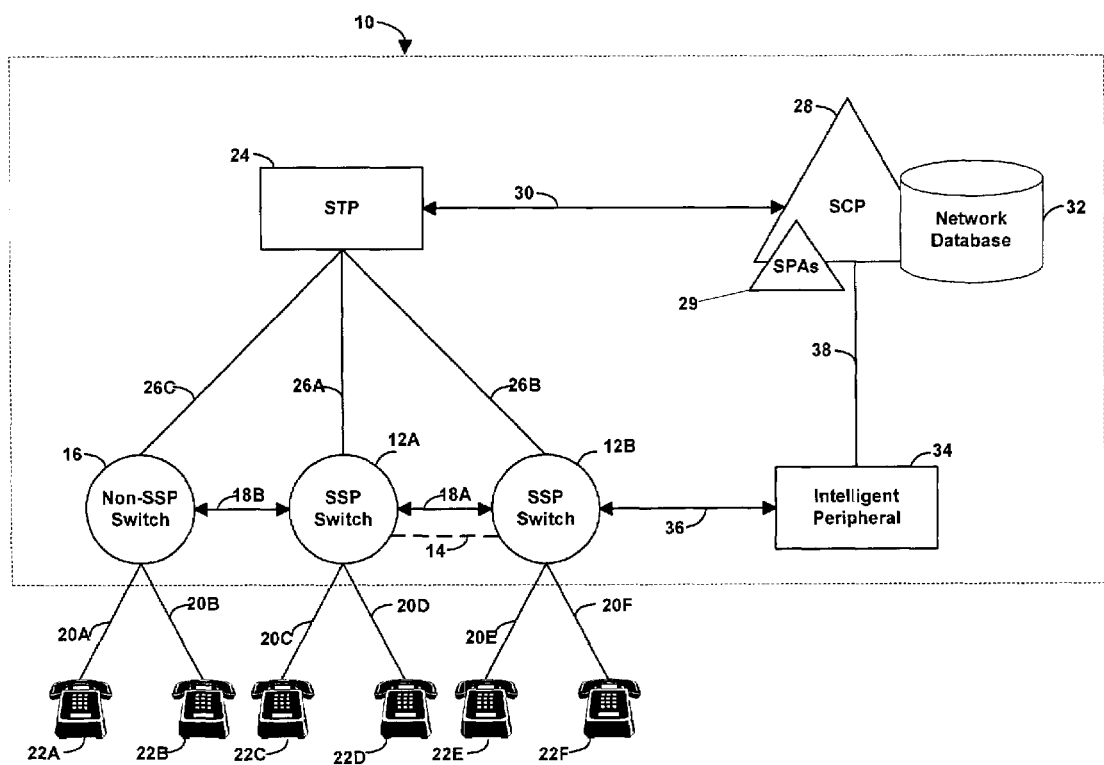
FIG. 1 is a functional block diagram illustrating one embodiment of an Advanced Intelligent Network (AIN) configured for integration with a public switched telephone network (PSTN)

Referring now to FIG. 1, a functional block diagram of one embodiment of an Advanced Intelligent Network (AIN) 10 is provided that is configured for integration with a PSTN. The AIN 10 may be employed by a Local Exchange Carrier (LEC) of a telecommunications entity, and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12A, 12B. The dashed line 14 between the SSP switches 12A, 12B indicates that the number of SSP switches in the AIN 10 may vary depending on the particular requirements of the AIN 10. The AIN 10 may also include a non-SSP switch 16. The difference between the SSP switches 12A, 12B and the non-SSP switch 16 is that the SSP switches 12A, 12B provide intelligent network functionality. Interconnecting the SSP switches 12A, 12B and the non-SSP switch 16 are one or more communication links 18A, 18B that may be, in one embodiment, trunk circuits.

The SSP switches 12A, 12B and the non-SSP switch 16 maintain connections with a number of subscriber lines 20A–20F. The subscriber lines 20A–20F may be conventional twisted pair loop circuits, for example, connected between the switches 12A, 12B, 16 and telecommunications equipment or devices located at the premises of a recipient or customer, or the subscriber lines 20A–20F may be trunk circuits, such as T-1 trunk circuits. Each of the subscriber lines 20A–20F is connected to a terminating piece of customer/subscriber premises equipment, represented in FIG. 1 for purposes of illustration by the landline telephones 22A–22F (respectively). Alternatively, the terminating equipment can include other types of telecommunications units or devices such as, for example, facsimile machines, personal computers, modems, private branch exchange (PBX) switching systems, and the like.

For the AIN 10 illustrated in FIG. 1, each of the SSP switches 12A, 12B and the non-SSP switch 16 are connected to a signal transfer point (STP) 24 via communication links 26A, 26B, 26C (respectively). The communication links 26A, 26B, 26C can employ, in one example application, the SS7 switching protocol. In another aspect, the STP 24 can be a multi-port high speed packet switch that is programmed to respond to routing information in the appropriate layer of the switching protocol to route one or more data packets to an intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point (such as one available from Lucent Technologies Inc., Murray Hill, N.J., for example). In another embodiment, the SCP 28 may be a web database server, for example. In one aspect, the SCP 28 can have an operatively associated network database 32 for storing network data. It can be appreciated by those skilled in the art that the intelligent functionality of the SCP 28 can be realized by one or more application programs, such as programmable Service Package Applications (SPAs) 29 that are executed by the SCP 28. The SPAs 29 include intelligent logic and are configured to receive queries forwarded by the SCP 28 from other components of the AIN 10. The SCP 28, in conjunction with operation of the SPAs 29, can be employed to implement high volume routing services, such as call forwarding and number portability translation and routing, for example. In addition, another function of the SCP 28 can include hosting the network database 32, which can store subscriber information, such as subscriber call management profiles, for example, for use in providing enhanced calling services.

In one aspect, the AIN 10 illustrated in FIG. 1 can include an intelligent peripheral (IP) 34. The IP 34 can be, for example, a Compact Services Node (CSN) (such as a CSN available from Lucent Technologies Inc., Murray Hill, N.J.), although the IP 34 may be any other type of available AIN-compliant service node. The IP 34 may be connected to one or more of the SSP switches 12A, 12B via a communications link 36 which can be, for example, an Integrated Service Digital Network (ISDN), including BRI (Basic Rate Interface) or PRI (Primary Rate Interface) lines. According to other embodiments of the present methods and systems, the communications link 36 can be, for example, a T-1 trunk circuit. The IP 34 can be used when an enhanced telecommunications feature or service is needed for a particular call such as, for example, call return and calling name services. As with the SCP 28, the intelligent functionality of the IP 34 can be realized by one or more programmable applications that are executed by the IP 34. In another aspect, a communications link 38 can be established between the SCP 28 and the IP 34.

To perform and maintain processing of data and calls at the switches, such as the SSP switches 12A, 12B, a set of triggers can be defined at the SSP switches 12A, 12B for each call. It can be appreciated by one skilled in the art that a trigger in the context of the AIN 10 is an event associated with a particular subscriber line 20A–20F. The trigger generates a data packet for transmission from the SSP switches 12A, 12B servicing the subscriber lines 20C–20F to the SCP 28 (and its operatively associated SPAs 29) via the STP 24. In various aspects of the present methods and systems, the triggers can be originating triggers for calls originating from the subscriber premises or terminating triggers for calls terminating at the subscriber premises. A trigger causes a message in the form of a query to be sent from the SSP switches 12A, 12B to the SCP 28 for further processing.

In another aspect, the SCP 28 can forward a query to the SPAs 29 and/or the network database 32 to determine whether one or more customized call features or enhanced services should be implemented for a particular call, or whether conventional dial-up telephone service should be provided. The results of the query are sent from the SCP 28 to the SSP switches 12A, 12B via the STP 24. The return data packet includes instructions to the SSP switches 12A, 12B for processing the call. The instructions may include directions to take a special action as a result of a customized calling service or enhanced feature associated with the call. For example, for an enhanced calling feature requiring the capabilities of the IP 34, the return message received from the SCP 28 may include instructions for one of the SSP switches 12A, 12B to route the call to the IP 34. In addition, the return message received from the SCP 28 may simply be an indication that there is no entry in the network database 32 that indicates anything other than conventional telephone service should be provided for the call. In one example aspect of the present methods and systems, the query and return messages can be formatted according to conventional SS7 Transaction Capabilities Application Part ("TCAP") formats.

The AIN 10 as illustrated in FIG. 1 includes only one STP 24, one SCP 28, one network database 32, and one IP 34, although the AIN 10 may further include an additional number of these components as well as other network components that are not included in FIG. 1 for purposes of clarity. For example, the AIN 10 may additionally include redundant SCPs and STPs that function in the event or improper operation or malfunction of the STP 24 or the SCP 28. In addition, the AIN 10 may include an Automatic Electronic Switching System (AESS) Network Access Point (NAP) in communication with the STP 24, which can be programmed to detect trigger conditions. Furthermore, the AIN 10 may include regional STPs and regional SCPs in communication with, for example, the local STP 24, for routing and servicing calls between different LECs.

Figure 2:
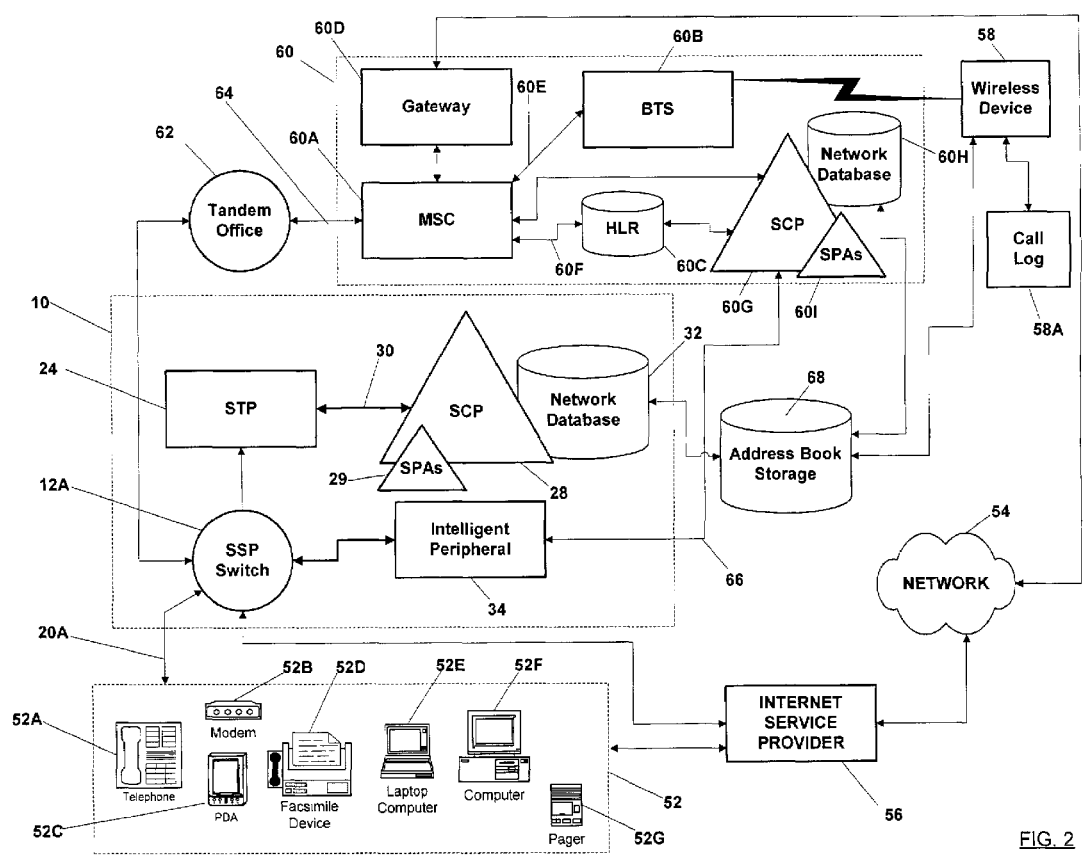
FIG. 2 is a diagram illustrating a network for providing a user of a telecommunications device the ability to send messages according to various embodiments of the present methods and systems.

Referring now to FIG. 2, one embodiment of the present methods and systems is provided that illustrates a system for providing a wireless telecommunications device with the ability to obtain address information and send messages to recipient telecommunications devices. As shown in FIG. 2, the recipient telecommunications devices 52 can include, for example and without limitation, a telephone 52A, a modem 52B, a personal digital assistant (PDA) 52C, a facsimile device 52D, a laptop computer 52E, a computer 52F, and/or a pager 52G (e.g., such as an interactive RIM pager). The system includes portions of the AIN 10 illustrated in FIG. 1, including the SSP switch 12A, the STP 24, the SCP 28, the network database 32 and the IP 34. The recipient telecommunications devices 52 are connected to the SSP switch 12A of the AIN 10 with one or more subscriber lines such as line 20A, for example.

According to one embodiment of the present methods and systems, the AIN 10 is in communication with a network 54 through an Internet service provider (ISP) 56. The network 54 may be, for example, in communication with the Internet or an intranet via, for example, the ISP 56.

Various embodiments of the present methods and systems also permit a wireless device 58 to send telephone messages or electronic mail, for example, to the recipient telecommunications devices 52. In one aspect, the wireless device 58 can be in communication with the SSP switch 12A via a wireless network 60 and a tandem office 62. The wireless network 60 includes a mobile switching center (MSC) 60A, a base transceiver station (BTS) 60B, a home location register HLR 60C, a gateway 60D, and an SCP 60G having an operatively associated network database 60H. As shown in FIG. 2, the MSC 60A is in communication with the wireless telecommunications device 58 through the BTS 60B. The BTS 60B can communicate with wireless telecommunications device 58 according to an air-interface communication scheme such as, for example, AMPS (ANSI-553), TDMA (IS-136), CDMA (IS-95), or GSM. In addition, the BTS 60B can be in communication with the MSC 60A via a communications link 60E.

In one aspect of the present methods and systems, the MSC 60A is an automatic switching system in the wireless network 60 that acts as the interface for subscriber traffic between the wireless network 60 and the components of the AIN 10 or another network. In one aspect, the MSC 60A performs generally the same function as a central office switch in a wireline network. In addition, the MSC 60A can support wireless telecommunications through its operative connection with the BTS 60B. Examples of such wireless telecommunications include handoff and roaming functions associated with the wireless device 58. The MSC 60A can also be operatively associated with wireless intelligent network functionality for detecting originating and terminating triggers, for example.

In another aspect, the MSC 60A can be in communication with the HLR 60C via a communications link 60F that may be an SS7 signaling protocol link, for example. The HLR 60C is a location register to which the user identity of a wireless telecommunications unit (such as the Mobile Identification Number ("MIN") of the wireless device 58, for example) is assigned for record purposes. The HLR 60C stores information and data of a static nature, such as the identifying indicia associated with the wireless device 58, for example, that are not routinely modified. In another aspect, the MSC 60A can be in communication with an SCP 60G having an operatively associated network database 60H and one or more SPAs 60I. The network database 60H can include register subscriber information relating to wireless devices such as, for example, profile information, current location, authorization period, instant messaging address, pager address, facsimile number, electronic mail address and other information. It can be seen that the information contained in the network database 60H is of a more dynamic nature compared to the static data stored in the HLR 60C, for example. Accordingly, through its access to the HLR 60C and the SCP 60G with its database 60H, the MSC 60A servicing a particular area has access to information regarding each of the wireless device 58 users presently operating in that area.

In one aspect, the tandem office 62 provides a switching interface between the SSP switch 12A and the wireless network 60. The tandem office 62 may be in communication with the MSC 60A via a communications link 64, which may be, for example, a trunk circuit or an ISDN. The gateway 60D may be any type of gateway or server that allows the wireless network 60 to interface with the network 54 such as, for example, a wireless application protocol (WAP) proxy server, a WAP gateway, or an uplink server. In addition, the intelligent peripheral 34 may be in communication with the SCP 60G of the wireless network 60 via a communications link 66 employing, for example, the IS-41 signaling protocol.

Figure 3:
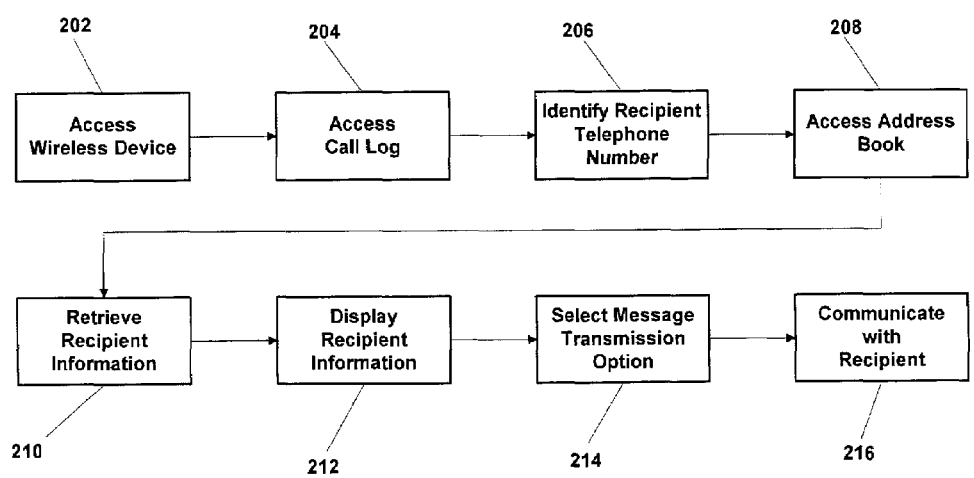
FIG. 3 is a process flow diagram depicting one illustrative method embodiment for obtaining address information and establishing communication in accordance with the present methods and systems.

Referring now to FIGS. 2 and 3, in one aspect of the present methods and systems, the wireless device 58 is operatively associated with an address book storage 68. The address book storage 68 can be locally or remotely operatively associated with the wireless device 58. The address book storage 68 contains a variety of information associated with facilitating communication with the various types of the recipient telecommunications devices 52 and the wireless device 58. For local operative association of the wireless device 58 and the address book storage 68, such communication information may also be stored on a medium or media installed within the wireless device 58.

For remote operative association of the wireless device 58 and the address book storage 68, a trigger can be invoked to instruct the MSC 60A to query the SCP 60G to provide desired recipient information. A query is sent to the SCP 60G that can be processed by one or more SPAs 60I operatively associated with the SCP 60G. Pursuant to the query, data are retrieved for the address book storage 68 from a subscriber profile stored in the network database 60H. The contents of the address book storage 68, including name, numbers, electronic mail addresses, and instant messaging addresses, for example, can be maintained on either the wireless device 58 or within a subscriber database, such as the network database 60H operatively associated with the SCP 60G.

In one aspect, the network database 60H is a main database of subscriber information for the wireless network 60. Maintained by the SPC 60G, the network database 32 can contain user/subscriber information, including, for example, address information, account status, user preferences, electronic mail addresses, pager addresses, facsimile numbers, wireless telephone numbers, landline telephone numbers, instant messaging information, and a variety of other similar telecommunications information associated with users/subscribers. As shown in FIG. 2, the SCP 60G and the network database 60H can be operatively connected to the MSC 60A for processing requests for recipient address information received from users/subscribers.

In step 202, in one embodiment of the present methods and systems, a user/subscriber accesses the wireless device 58 and may further access a call log 58A of the wireless device 58 in step 204. In the call log 58A, in step 206, the subscriber can identify and select a name and/or telephone number of a recipient from one or more lists of previously received calls, missed calls, and/or previously placed calls stored on the wireless device 58. Once a name and/or telephone number of a recipient is selected, the wireless device 58 can access the address book storage 68 in step 208 (through one of the methods and/or systems described hereinabove). In another embodiment, the subscriber can also identify address information associated with a recipient by directly accessing the address book storage 58 in step 208, either with or without using the call log 58A. The subscriber can then select a recipient name and/or telephone number from the address book storage 68.

In step 210, a trigger can be invoked to instruct the MSC 60A to query the SCP 60G to retrieve any available subscriber information of the recipient stored in either of the network databases 32, 60H, or from both databases 32, 60H. The MSC 60A sends a response received from the SCP 60G to the wireless device 58 to display the desired recipient contact information in step 212. Once the recipient contact information is returned to the address book storage 58, the subscriber may be prompted in step 214 to select a method of communication with the recipient, such as by telephone, facsimile, pager, electronic mail, instant messaging, and the like. The wireless device 58 can then communicate with one of the recipient telecommunications devices 52 in step 216 by creating, for example, a pager message, an electronic mail message, a facsimile message, by initiating a chat session, or by initiating a wireless telephone call to the recipient.

In one embodiment, the IP 34 may include a DTMF decoder that is programmed to recognize the dialing of certain digits or characters of, for example, a touch-tone telephone. In one embodiment, the user of the wireless device 58 may input a telephone number associated with the facsimile device 52D or an address of the computer 52F, for example, using a touch-tone keypad on the wireless device 58. In one embodiment, the user of the wireless device 58 may input a message that is to be sent to the recipient telecommunications devices 52 via a touch-tone keypad on the wireless device 58. In the case of an electronic mail message sent from the wireless device 58 to one of the recipient telecommunications devices 52, the message may be sent by the gateway 60D to one of the recipient telecommunications devices 52 through the network 54. In the case of a facsimile message, for example, the message may be delivered to the facsimile device 52D via cooperation of the tandem office 62 and the AIN 10. It can be appreciated by those skilled in the art that there are a variety of ways by which address information can be accessed and retrieved and communication established between the wireless device 58 and the recipient telecommunications devices 52.

Figure 4:
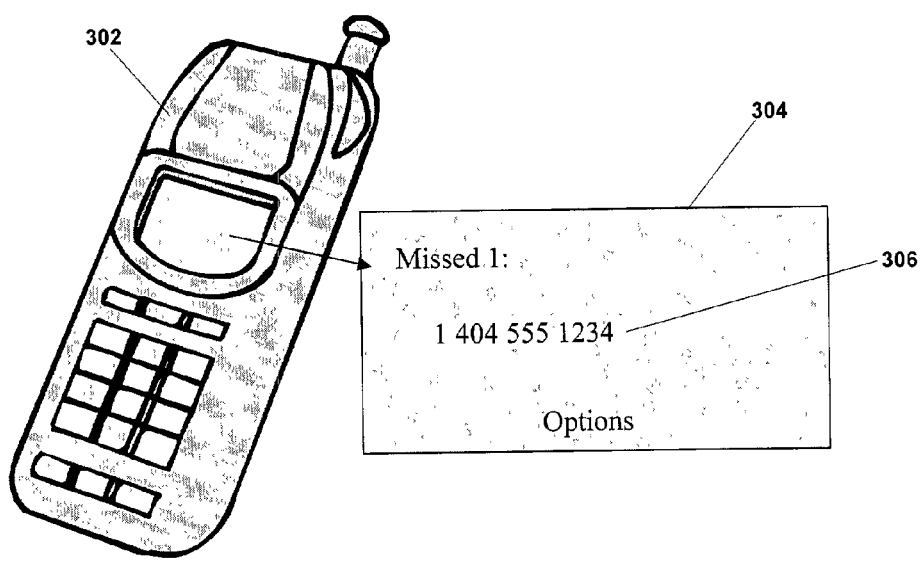
FIG. 4 shows an illustrative embodiment of a wireless device and a screen display provided in accordance with one or more embodiments of the present methods and systems.

In one operative example of the present methods and systems shown in FIGS. 4 through 8, a user accesses a missed call log storage medium on a wireless device 302. In other aspects of the present methods and systems, it can be appreciated that a log of previously received calls and/or a log of previously dialed calls can also be accessed by the user with the wireless device 302. As shown in the example of FIG. 4, a first screen display 304 presented on the screen of the wireless device informs the user that one call to the wireless device 302 has been missed. The telephone number 306 of the caller whose call was missed is also provided on the first screen display 304. In other aspects of the present methods and systems, a pager number, a facsimile number, instant messaging information, or other data related to the address of the caller can be presented on the first screen display 304.

Figure 5:
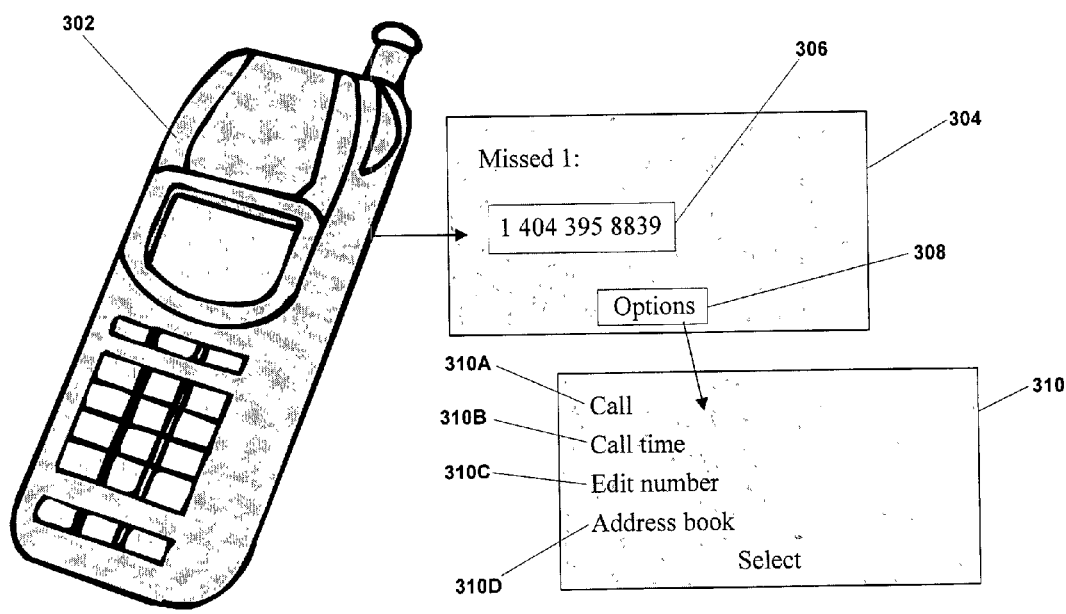
FIG. 5 shows an illustrative embodiment of a wireless device and various screen displays provided in accordance with one or more embodiments of the present methods and systems.

Referring now to FIG. 5, the telephone number 306 can be highlighted and an "Options" function 308 selected on the first screen display 304 to present a variety of options on a second screen display 310 of the wireless device 302. Sample options that can be made available include, for example and without limitation, a "Call" option 310A to return the call by the missed caller, a "Call time" option 310B to display the time that the missed call was placed by the missed caller, an "Edit number" option 310C to perform revisions or updates to the telephone number of the missed call, and an "Address book" option 310D to obtain additional information associated with the telephone number 306 of the missed caller.

Figure 6:
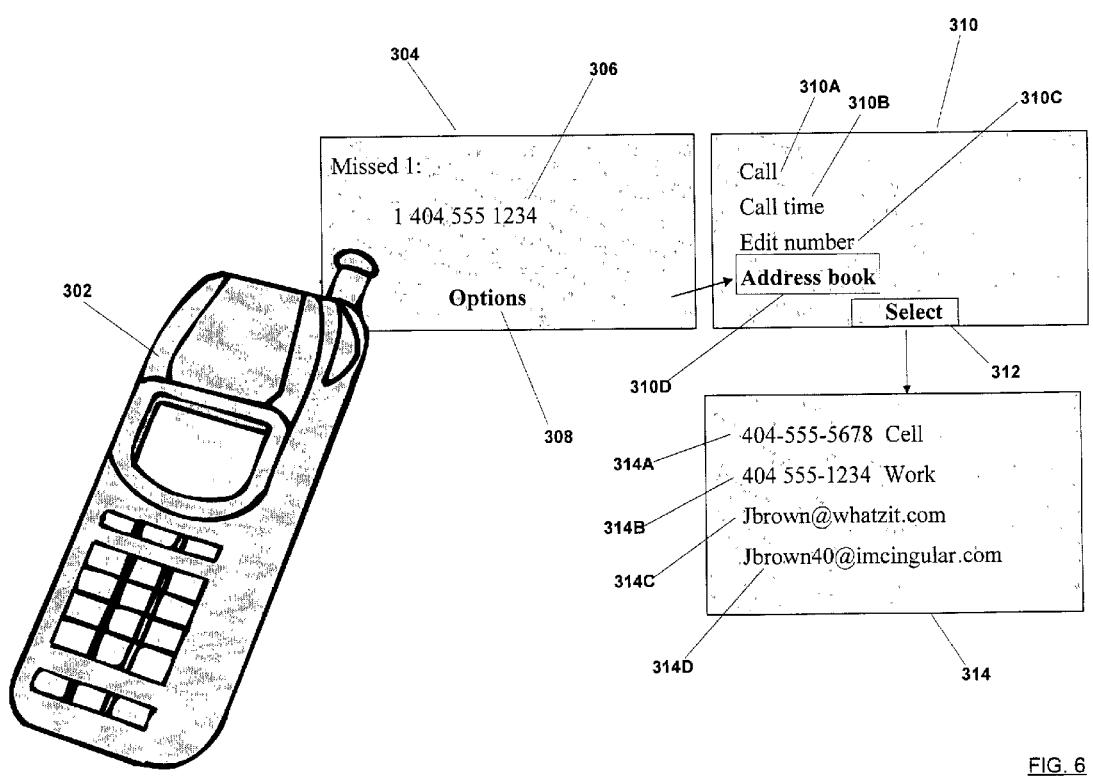
FIG. 6 shows an illustrative embodiment of a wireless device and various screen displays provided in accordance with one or more embodiments of the present methods and systems.

Referring now to FIG. 6, the "Address book" option 310D can be selected on the second screen display 310 provided on the wireless device 302. Choosing a "Select" function 312 on the second screen display 310 can then provide a third screen display 314 that includes information contained in the "Address book" option 310D. As discussed hereinabove, the "Address book" option 310D can represent a storage medium or media stored locally (internally or externally) in operative association with the wireless device 302. The "Address book" option 310D can also be stored on a storage medium or media operatively associated with a wireless network and/or an AIN. As shown in FIG. 6, the "Address book" option 310D can display information that includes, for example, a cellular telephone number 314A, a work telephone number 314B, an electronic mail address 314C, and/or a pager address 314D. The "Address book" option 310D provides the wireless device 302 with any available and accessible information associated with the telephone number or other address of the missed caller. Information provided by the "Address book" option 310D can be provided by any of the methods and systems for retrieval of address information described hereinabove.

Figure 7:
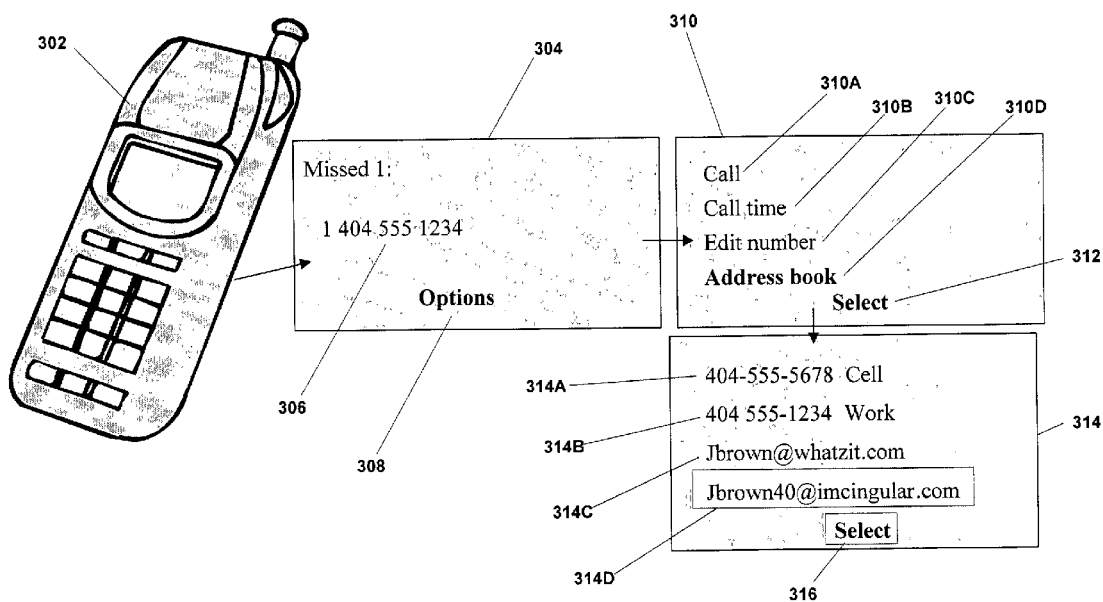
FIG. 7 shows an illustrative embodiment of a wireless device and various screen displays provided in accordance with one or more embodiments of the present methods and systems; and, FIG. 8 shows an illustrative embodiment of a wireless device and a screen display provided in accordance with one or more embodiments of the present methods and systems.
Figure 8:
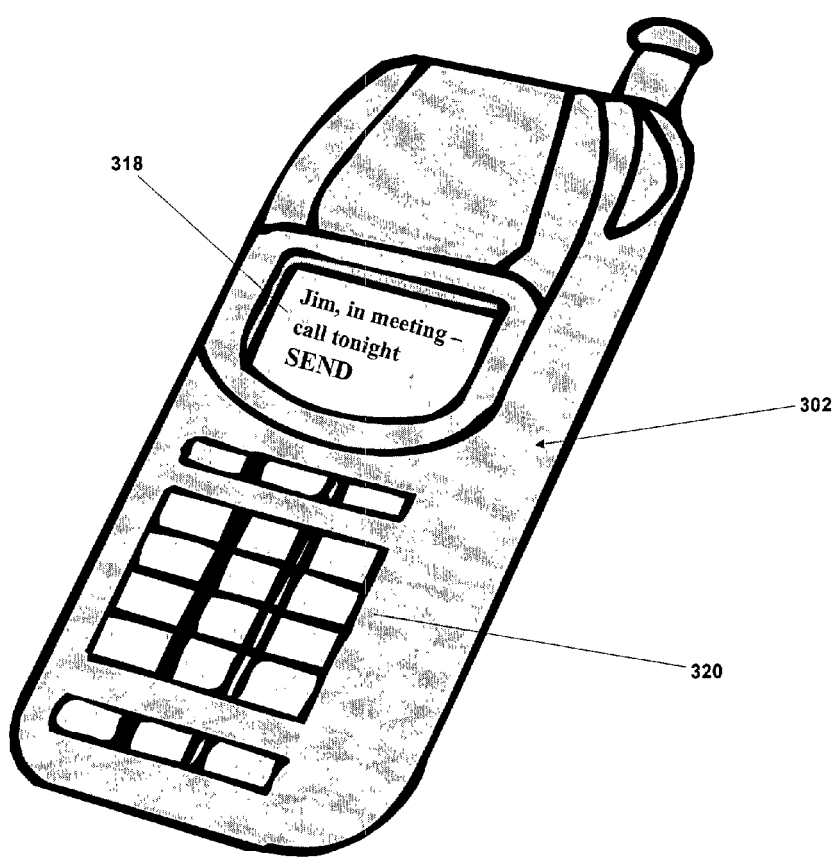

Referring now to FIGS. 7 and 8, the pager address option 314D can be selected on the third screen display 314 presented on the wireless device 302. Once the pager address 314D is highlighted a "Select" function 316 provided on the third screen display 314 can be selected and activated. As shown in FIG. 8, a pager message 318 can be entered on the screen of the wireless device 302 using a keypad 320 of the wireless device 302. Once the pager message 318 is entered, a "Send" function can be activated on the wireless device 302 to transmit the entered pager message 318 to the missed caller as a recipient of the pager message 318. After transmission of the pager message 318, it can be appreciated that the wireless device 302 can be returned to the state in which the wireless device 302 existed prior to accessing the missed call log.

The benefits of the present methods and systems are readily apparent to those skilled in the art. The features described herein in connection with the operation of wireless devices permit subscribers to access address information that includes telephone numbers, electronic mail addresses, instant messaging information, pager information, facsimile numbers, and the like. The present methods and systems enhance convenience of telecommunications by providing available address book information to the wireless device.

The examples presented herein are intended to illustrate potential implementations of the present method and system embodiments. It can be appreciated that such examples are intended primarily for purposes of illustration of the present methods and systems to those skilled in the art. No particular aspect or aspects of the example method and system embodiments described herein are intended to limit the scope of the present invention. The configuration and functions of a particular graphical screen display, for example, are provided merely for convenience of disclosure of the present methods and systems.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The term "wireless device" as applied herein may include, without limitation, one or more of the following devices: a wireless telephone, a wireless personal computer, a laptop, a personal digital assistant (PDA), a wireless pager, and a "computer" may be a microcomputer, minicomputer, laptop, personal data assistant, cellular phone, two-way pager, processor, and any other computerized device capable of transmitting, receiving and/or processing data over a wireless network or a shared network.

The term "computer-readable medium" is defined herein as understood by those skilled in the art. It can be appreciated that various method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A computer-assisted method for establishing communication with a wireless device and a recipient telecommunications device in a telecommunications network, said method comprising:
    storing address information associated with said recipient telecommunications device in a database structured for operative communication with said wireless device;
    receiving a first address associated with said recipient telecommunications device;
    identifying said first address as said address information;
    retrieving a second address associated with said recipient telecommunications device from said address information, in response to the identification of said first address, said second address being employable to establish communication between said wireless device and said recipient telecommunications devices;
    displaying said second address on a screen of said wireless device;
    establishing communication between said wireless device and said recipient telecommunications device using said second address in response to selection at said wireless device of said second address.

2. The method of claim 1, wherein at least one of said addresses is selected from the group consisting of a telephone number, a pager number, an electronic mail address, an instant messaging address, and a facsimile number.

3. The method of claim 1 wherein receiving said first address associated with said recipient telecommunications device includes receiving a notification of a missed call from said first address at said wireless device.

4. A system for establishing communication with a wireless device and a recipient telecommunications device in a telecommunications network, said system comprising:
- a database structured for operative communication with said wireless device, said database including address information associated with said recipient telecommunications device;
- an address book storage operatively associated with said wireless device, said address book storage being configured to receive said address information from said database;
- a call log means structured for operative communication with said wireless device, said call log means being configured to identify a first address associated with said recipient telecommunication device as said address information, a second address being retrieved from said address book storage in response to an identification of said first address;
- means for displaying said second address on a screen of said wireless device;
- means for establishing communication between said wireless device and said recipient telecommunications device using said second address in response to selection at said wireless device of said second addresses.

5. The system of claim 4, further comprising an AIN network configured to establish communication between said wireless device and said database.

6. The system of claim 4, wherein at least one of said addresses is selected from the group consisting of a telephone number, a pager number, an electronic mail address, an instant messaging address, and a facsimile number.

7. The system of claim 4, wherein said address book storage is located remotely with respect to said wireless device.

8. The system of claim 4, wherein said database includes a home location register.

9. A computer-readable medium including instructions for performing a method for establishing communication with a wireless device and a recipient telecommunications device in a telecommunications network, said method comprising:
- storing address information associated with said recipient telecommunications device in a database structured for operative communication with said wireless device;
- receiving a first address associated with said recipient telecommunications device
- identifying said first address as said address information; and
- retrieving a second address associated with said recipient telecommunications device from said address information in response to the identification of said first address, said second address being employable to establish communication between said wireless device and said recipient telecommunications device;
- displaying said second address on a screen of said wireless device;
- establishing communication between said wireless device and said recipient telecommunications device using said second addresses in response to selection at said wireless device of said second address.

10. The medium of claim 9, wherein at least one of said addresses is selected from the group consisting of a telephone number, a pager number, an electronic mail address, an instant messaging address, and a facsimile number.

11. A system for establishing communication with a wireless device and a recipient telecommunications device in a telecommunications network, said system comprising:
- means for storing address information associated with said recipient telecommunications device in a database structured for operative communication with said wireless device;
- means for receiving a first address associated with said recipient telecommunications device;
- means for identifying said first address as said address information; and
- means for retrieving a second address associated with said recipient telecommunications devices from said address information in response to the identification of said first address, said second address being employable to establish communication between said wireless device and said recipient telecommunications device;
- means for displaying said second address on a screen of said wireless device;
- means for establishing communication between said wireless device and said recipient telecommunications device using said second address in response to selection at said wireless device of said second address.

12. The system of claim 11, wherein at least one of said addresses is selected from the group consisting of a telephone number, a pager number, an electronic mail address, an instant messaging address, and a facsimile number.

* * * * *